A. P. WORTHINGTON.
LAWN RAKE.
APPLICATION FILED FEB. 16, 1912.
1,070,868.
Patented Aug. 19, 1913.
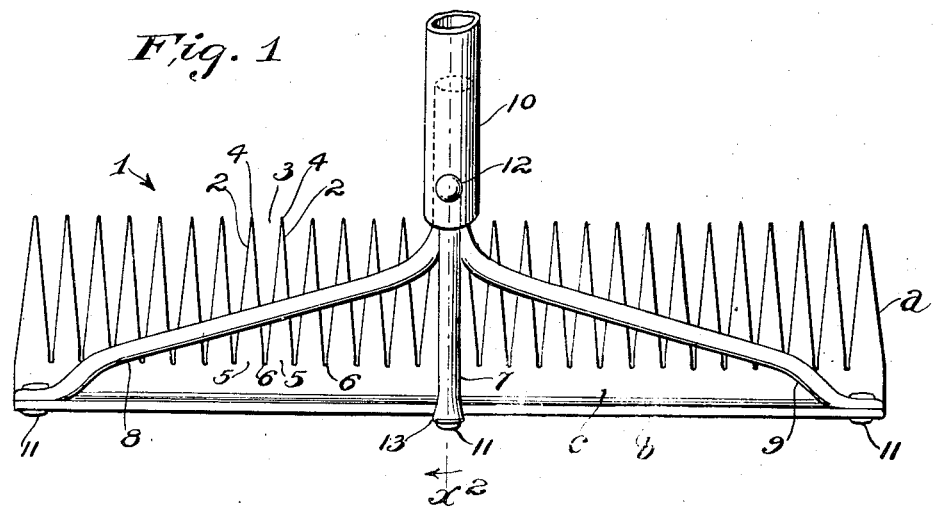
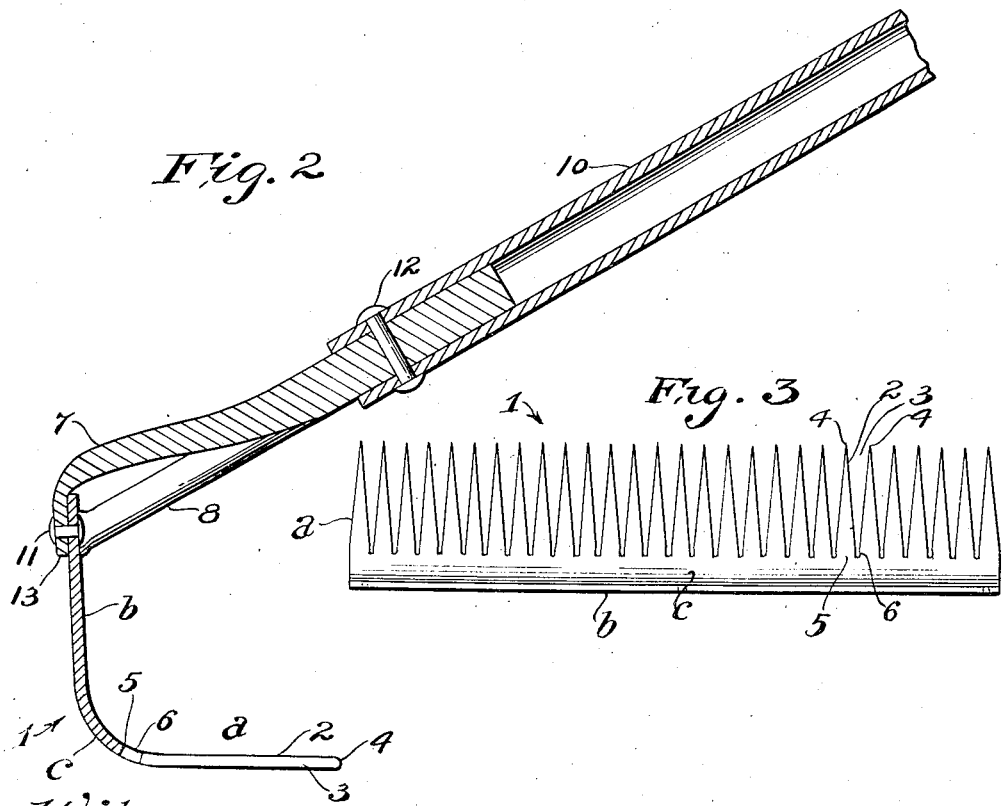
Witnesses
C. C. Holli
G. H. Hiles
Inventor
Albert P. Worthington
by James R. Townsend
his atty

UNITED STATES PATENT OFFICE.

ALBERT P. WORTHINGTON, OF LOS ANGELES, CALIFORNIA.

LAWN-RAKE.

1,070,868.  Specification of Letters Patent.  Patented Aug. 19, 1913.

Application filed February 16, 1912. Serial No. 678,123.

*To all whom it may concern:*

Be it known that I, ALBERT PLATT WORTHINGTON, a citizen of the United States, residing at Los Angeles, in the county of Los Angeles and State of California, have invented a new and useful Lawn-Rake, of which the following is a specification.

This invention relates to an implement for cleaning lawns of undesirable growths and of grass clippings and other material that may accumulate close to the ground.

The invention is more particularly designed to eradicate Bermuda grass from blue-grass lawns, but may be put to other uses. Bermuda grass is propagated by seeds and by runners radiating from a central stock and having rootlets at their joints. In order to eradicate this grass it is necessary to detach the rootlets from the ground or to prevent vitalizing growth from such roots as may remain.

The object of this invention is to construct a rake by which such grass may be uprooted in a practical manner; said rake being so constructed that its tendency, in operation is to slide beneath the runners and detach the roots of the plant from the ground without breaking the joints or runners.

Another object is to so construct the rake that it will best withstand the heavy strains thereon required to be borne in detaching the grass from the ground.

The accompanying drawings illustrate the invention.

Figure 1 is a plan view of the implement in the position it would occupy while being slipped beneath the growth that is to be removed. A portion of the handle is broken away to contract the view. Fig. 2 is an enlarged sectional elevation on line indicated by $x^2$, Fig. 1. Fig. 3 is a reduced plan view of the rake blade detached.

The rake head 1 comprises a longitudinally bent sheet metal blade, angular in form and notched transversely along one leg, being there provided with elongate triangular and practically flat teeth 2 forming intermediate elongate, triangular notches 3. A desirable shape of tooth is secured by making the notches and teeth two inches long; the width of notch between the tooth points 4 being one-half inch and each tooth being three-eighths of an inch wide from its heel 5 to a point one-eighth of an inch forward of its heel, so as to form a short straight narrow slot 6 between each two adjacent teeth at the apex of the notch. Those portions of the teeth adjacent the slots 6 are preferably slightly curved upward.

The blade is made of strong rigid material, such as boiler-plate, being in practice about one-eighth of an inch, more or less, thick. The teeth are practically the same thickness from point to heel, and they gradually diminish in width from the forward end of the slots 6 to the points 4, so that as the rake is drawn forward the tendency of the teeth is to wedge the runners of Bermuda grass and the like laterally, thus to separate them from the soil without exerting any vertical wedging action which would be liable to break the runners between the joints, the root stems of which are not cut by the gradually widening teeth but are accommodated in the short straight slots 6. Comparatively great strength is required to withstand the strain necessary to detach this jointed grass from a foul lawn, and the purpose of using boiler-plate is to secure the strength and rigidity necessary to withstand such strains. Said boiler-plate may be perforated in the unnotched leg to receive fastenings for a central shank 7 and side shanks 8, 9 of the handle 10. Said shanks may be fastened to the blade by various means as for example, by molding or by the rivets 11. The handle 10 is metal, being in the form shown, a piece of gas pipe into which the ends of the shanks 7, 8, 9 are inserted and welded or clamped and secured by a rivet 12. The central shank 7 is fastened near said rear edge and is preferably formed with a hook 13, caught behind said rear edge, the rivet 11 passing through said hook and the blade. The side shanks 8 and 9 are fastened between the notched leg and the unnotched edge of the other leg and near to the ends of the blade. The handle is angularly arranged with relation to the teeth so that, when the handle is held aslant, the teeth will lie close to the ground along practically their full length as shown in Fig. 2, in order that the teeth may slide beneath the runners of the grass.

The teeth being triangular and of practically even thickness from heel to point will slip out from the grass on the back stroke, and on the front stroke they will wedge between the grass roots, thus first detaching them from the ground, and they will then catch the root stems in the short straight slot, thus to drag them from the ground and at the same time there is no wedging action applied to lift the runners to break them from the roots.

The notched leg $a$ and the unnotched leg $b$ of the plate are connected by a curved portion $c$ which serves as the front of the runner when the implement is pushed and serves as a receiver for the dislodged material as the implement is pulled.

In practical use the operator having placed the implement in substantially the position shown in Fig. 2 will reciprocate the handle endwise, thus to move the blade forward and back. At the forward stroke it catches and wedges apart the runners of the plant without breaking them from the root and then by reason of the short straight slot 6 pulls the roots of the plant from the ground. On the back stroke it escapes readily from the material into which it has been drawn and rides easily over the grass and ground behind it. The ready escape of the implement from the mass of material is attained by reason of the shortness of the straight slots and this greatly lessens the labor that would otherwise be required to operate the implement.

I claim:—

1. A rake comprising a blade having elongate notches along its edge forming flat triangular teeth, there being short straight slots at the apexes of the notches, and a handle fastened to the blade.

2. A rake comprising a boiler-plate bent longitudinally to form two flat legs connected by a semi-cylindrical bend, one of said legs being slotted from its edge to the bend by elongate triangular slots terminating in portions at the bend having parallel sides.

3. In a rake, a blade provided with teeth forming elongate triangular notches and forming short straight slots at the apexes of the notches.

4. In a rake, a blade provided with teeth forming triangular notches and forming straight slots at the apexes of the notches, said blade being flat along the triangular notches and curved along the straight slots.

In testimony whereof, I have hereunto set my hand at Los Angeles, California, this 10th day of February, 1912.

ALBERT P. WORTHINGTON.

In presence of—
   JAMES R. TOWNSEND,
   L. BELLE RICE.